United States Patent [19]

Tanaka et al.

[11] Patent Number: 4,628,485
[45] Date of Patent: Dec. 9, 1986

[54] MAGNETO-OPTICAL RECORDING MEDIUM

[75] Inventors: Fujio Tanaka, Tanashi; Yasuyuki Nagao, Yokohama; Nobutake Imamura, Kamakura, all of Japan

[73] Assignee: Kokusai Denshin Denwa Kabushiki Kaisha, Tokyo, Japan

[21] Appl. No.: 631,580

[22] Filed: Jul. 17, 1984

[30] Foreign Application Priority Data

Jul. 20, 1983 [JP] Japan ................................ 58-130771

[51] Int. Cl.⁴ ........................ G11B 23/00; G11C 11/42
[52] U.S. Cl. .................................... 365/122; 360/131; 428/692
[58] Field of Search ................ 365/122; 350/374, 375; 250/570; 360/131, 159; 428/692, 694

[56] References Cited

U.S. PATENT DOCUMENTS 4,497,006 1/1985 Deguchi et al. .................... 365/122
4,559,573 12/1985 Tanaka et al. ...................... 365/122

FOREIGN PATENT DOCUMENTS 0051296 5/1982 European Pat. Off. ............ 365/122

Primary Examiner—James W. Moffitt
Attorney, Agent, or Firm—Robert E. Burns; Emmanuel J. Lobato; Bruce L. Adams

[57] ABSTRACT

A magneto-optical recording medium comprising: a recording layer of a magnetic thin film low in the Curie temperature or magnetic compensation temperature and high in coersive force and having an easy axis of magnetization in a direction perpendicular to the film surface; a reproducing layer disposed adjacent the recording layer and large in the magnetic Kerr rotation angle and having an easy axis of magnetization in a direction perpendicular to the film surface; and a transparent substrate disposed on the side of incidence of light. In accordance with the present invention, a reflecting metal layer is provided for reflecting light having entered from the side of the transparent substrate and passed through the recording layer and the reproducing layer. A dielectric layer may be further disposed at least on one side of the transparent substrate or the reflecting metal layer with respect to the recording layer and the reproducing layer. The order of the recording layer and the reproducing layer may be replaced by each other.

3 Claims, 9 Drawing Figures

EASY AXIS OF MAGNETIZATION

LIGHT

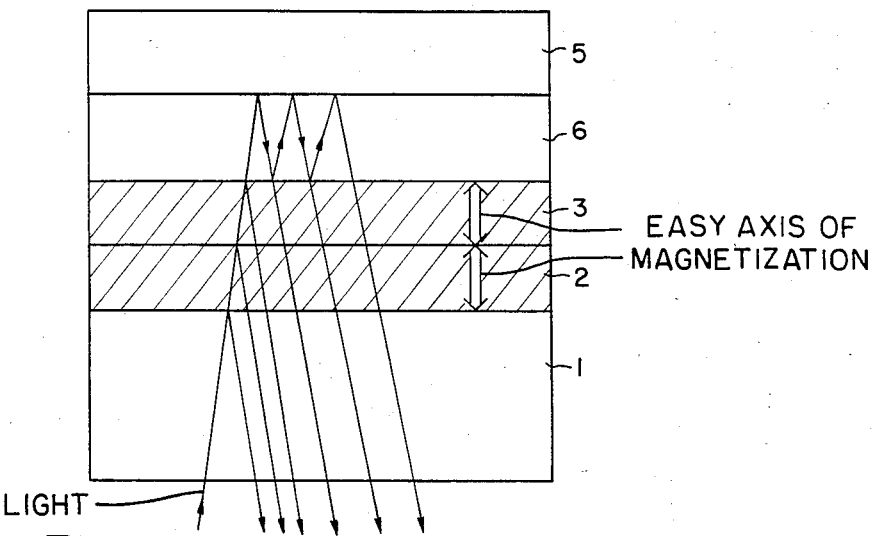
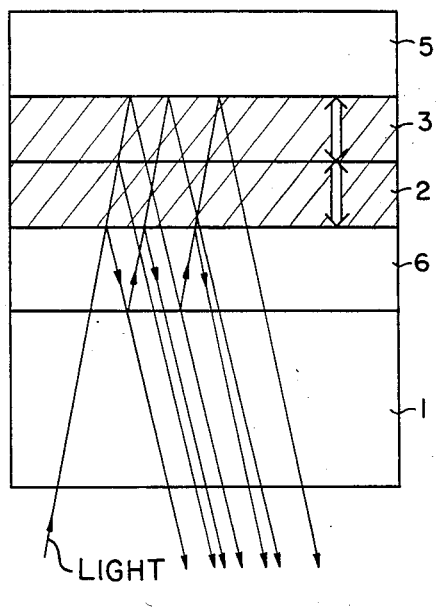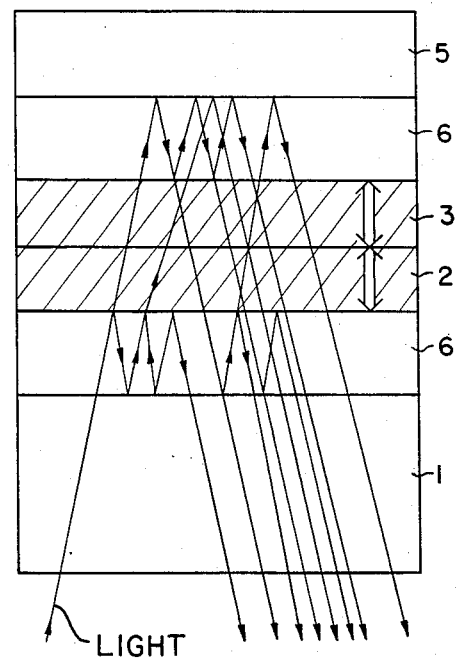

MAGNETO-OPTICAL RECORDING MEDIUM

BACKGROUND OF THE INVENTION

The present invention relates to a magneto-optical recording medium for use as a magneto-optical memory, a magnetic recording and display element and so forth and, more particularly, to a magnetic thin film recording medium which has an easy axis of magnetization in a direction perpendicular to the film surface and permits recording of information by forming an inverted magnetic domain of a cylindrical or any other arbitrary configuration and reproducing of the information through utilization of the magnetic Kerr effect.

With ferromagnetic thin films which have an easy axis of magnetization in a direction perpendicular to their film surface, it is possible to form a small inverted magnetic domain of a magnetic polarity reverse from a uniform magnetization polarity in the film surface uniformly magnetized to a south or north magnetic pole. By making the presence and absence of such inverted magnetic domains correspond to digital signals "1" and "0", respectively, such ferromagnetic thin films can be used as high density magnetic recording media. These ferromagnetic, vertically magnetized thin films are typically amorphous rare earth, transition metal alloy thin films, such as, for example, Gd-Co, Gd-Fe, Tb-Fe, Dy-Fe, GdTbFe, etc.; in addition, there are MnBi as a polycrystalline metal thin film and GIG as a compound single crystal thin film.

Recording of information in these thin films is usually effected by heating them up to a temperature higher than the Curie temperature or magnetic compensation temperature of the thin films to form therein an inverted magnetic domain at a desired position. The recorded information is reproduced through utilization of the magnetic Kerr effect that when linearly polarized light is incident on and reflected by the magnetic thin film, the plane of polarization rotates to the right or left according to the direction of magnetization (the Kerr rotation).

In this case, the S/N ratio obtained by reading out a recorded signal by means of light is not so high.

SUMMARY OF THE INVENTION

An object of the present invention is to provide a photomagnetic recording medium of a higher S/N ratio improved from the conventional structure described above.

In accordance with the present invention, there is provided a magneto-optical recording medium comprising: a recording layer of a magnetic thin film low in the Curie temperature or magnetic compensation temperature and high in coersive force and having an easy axis of magnetization in a direction perpendicular to the film surface; a reproducing layer of a magnetic thin film disposed adjacent the recording layer, large in the magnetic Kerr rotation angle and having an easy axis of magnetization in a direction perpendicular to the film surface; a transparent substrate disposed on the side of incidence of light; and a reflecting metal layer for reflecting light having entered from the side of the transparent substrate and passed through the recording layer and the reproducing layer. A dielectric layer may be further disposed on at least one side of the transparent substrate or the reflecting metal layer with respect to the recording layer and the reproducing layer.

BRIEF DESCRIPTION OF THE ACCOMPANYING DRAWINGS

The present invention will be described in detail below in comparison with prior art with reference to the accompanying drawings, in which:

FIG. 6A, 6B and 6C are longitudinal sectional views illustrating other embodiments of the present invention.

DETAILED DESCRIPTION

Figure 1:
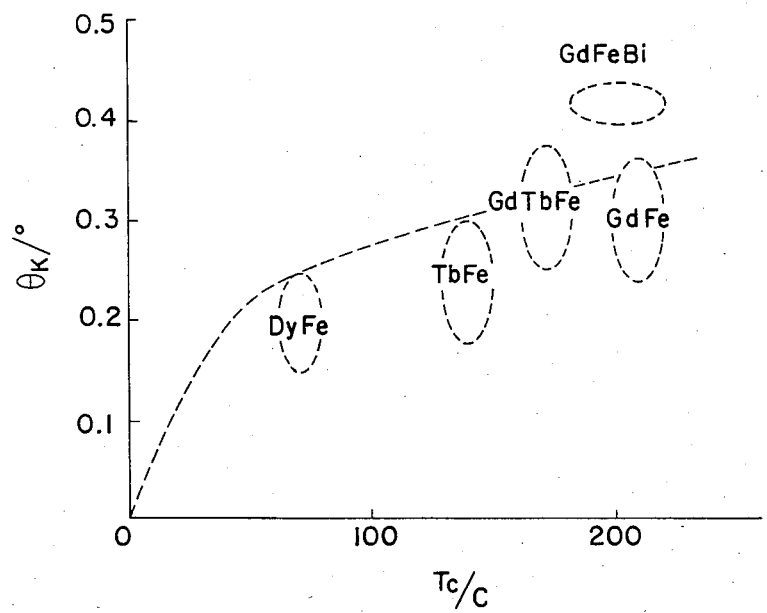
FIG. 1 is a characteristic diagram showning the relationship between the Curie temperature Tc and the Kerr rotation angle $\theta_k$.

To make differences between the prior art and the present invention clear, the prior art is at first described. By the way, the S/N ratio in the case of reading out a recorded signal by means of light is as follows:

$$S/N \alpha \sqrt{R} \cdot \theta_k$$

where R is the reflectively of the magnetic thin film and $\theta_k$ is the rotation angle (the Kerr rotation angle) of the plane of polarization by the magnetic Kerr effect. This equation indicates that the S/N ratio can be raised by increasing the reflectivity R or the Kerr rotation angle $\theta_k$, but the reflectivity R of the magnetic medium is approximately 50% and is constant irrespective of the aforementioned kinds of media. The Kerr rotation angle $\theta_k$ deviates with the kinds of media, as shown in FIG. 1, and it generally tends to increase with an increase in the Curie temperature Tc. For this reason, the S/N ratio can be improved by the use of GdFeBi or GdTbFe which has a large Kerr rotation angle $\theta_k$, but since their Curie temperature Tc or magnetic compensation temperature is high, a large recording power is needed and, at the present, high speed recording through the use of a semiconductor laser is impossible.

Figure 2:
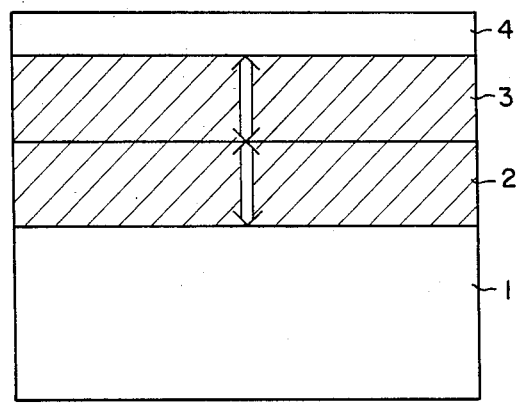
FIG. 2 is a longitudinal sectional view illustrating an example of the structure of a conventional photomagnetic recording medium in which a recording layer and a reproducing layer are separate.
Figure 3:
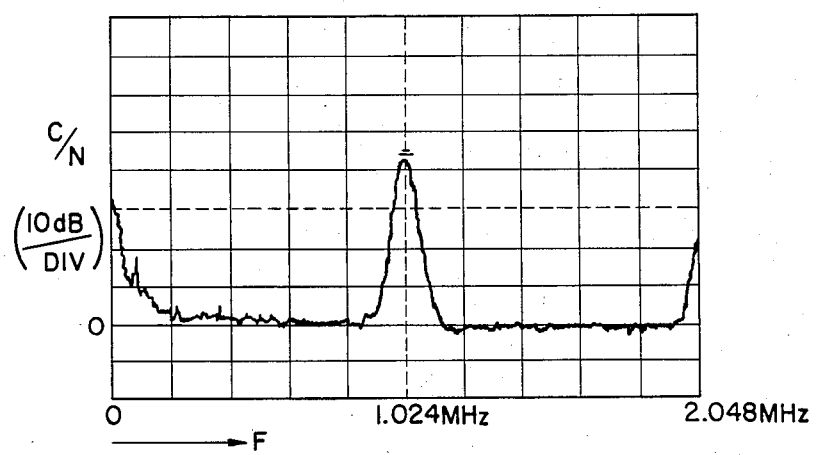
FIG. 3 is a diagram showing a measured example of the C/N characteristic of a conventional example.

Incidentally, as top data on C/N [C/N=S/N+10 log (a noise band)/(a resolution band width)] obtainable with a single-layer medium, there has been reported a value of 42 dB obtained with a medium of TbFe at a recording frequency of 1 MHz and in a band width of 30 KHz. Then, as a method of improvement for obtaining higher C/N, there has been proposed such a structure as shown in FIG. 2 in which the recording layer and the reproducing layer are separate layers. This employs, as a reproducing layer 2, a high Curie temperature, low coersive layer of perpendicular easy axis of magnetization (shown by an arrow) formed on a transparent substrate 1 as of glass or plastic material and, as a recording layer 3, a low Curie temperature, high coersive force layer of perpendicular easy axis of magnetization (shown by an arrow). A support layer 4 of dielectric material, such as $SiO_2$ is provided on the recording layer 3. Usually, GdFe or GdCo is used for the former and TbFe or DyFe for the latter. This utilizes the fact that a bit formed in the recording layer is also formed in the reproducing layer by a coupling phenomenon between the recording and reproducing layers by virtue of a magnetostatic force and an exchange force therebetween. Therefore, recording can be effected even by a low recording power, and since the Kerr rotation angle $\theta_k$ is large, reproducing can be carried out with a high C/N. FIG. 3 shows an example, measured by a spectrum analyzer, of the reproduced spectrum of a signal recorded at a recording frequency of 1 MHz and with a recording laser power of 8 mW. A value of C/N≃45 dB was obtained, which is larger than 42 dB obtained by the aforesaid single-layer film of TbFe.

The present invention will hereinafter be described in detail.

Figure 4A:
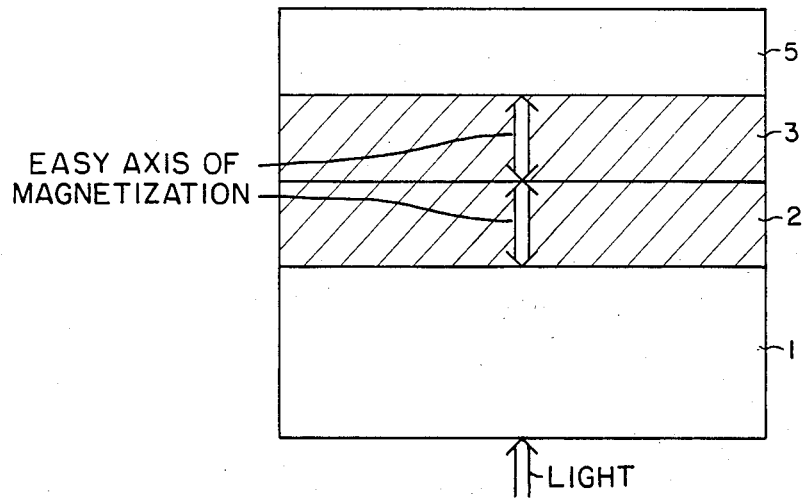
FIGS. 4A and 4B are longitudinal sectional views illustrating embodiments of the present invention.
Figure 5:
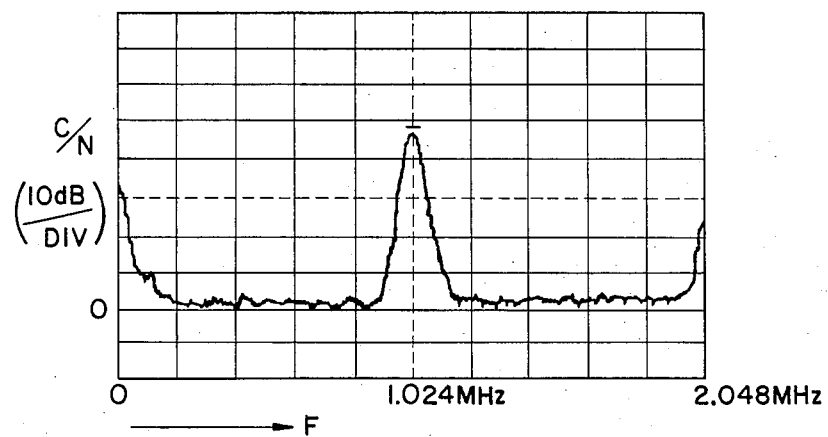
FIG. 5 is a diagram showing a measured example of the C/N characteristic of the embodiment shown in FIG. 4A.
Figure 4B:
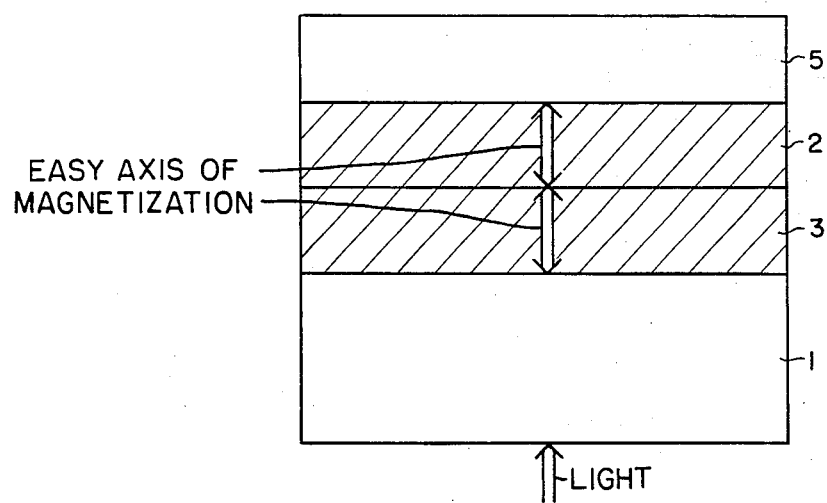

FIG. 4A illustrates the structure of an embodiment of the present invention. On the transparent substrate 1 as of glass or plastic there are formed the reproducing layer 2 of a material which causes a large Kerr rotation angle, such as GdFe, GdFeBi or the like, and the recording layer 3 of a material the Curie temperature of which is low, such as TbFe, DyFe or the like. The reproducing layer 2 and the recording layer 3 are formed thin enough to pass light therethrough, i.e. less than 500 Å. A reflecting layer 5 is provided, as the uppermost layer, for reflecting light having passed through the layers 2 and 3. The reflecting layer 5 is formed of, for example, Au, Ag, Cu or the like. With the provision of such a reflecting layer, the apparent Kerr rotation angle $\theta_k$ is increased by the Kerr effect which is produced by the reflection of incident light from the side of the transparent substrate 1 at the surface of the reproducing layer 2 and by the Faraday rotation of the plane of polarization which are produced by the Faraday effect when the incident light passes through the reproducing layer 2 and the recording layer 3, which are magnetic layers, and when the light reflected by the reflecting layer 5 passes again through the recording layer 3 and the reproducing layer 2. As a result of this, the S/N ratio is improved. In fact, comparison between the Kerr rotation angles $\theta_k$ obtained with the structure of FIG. 2 and this embodiment, measured through using He-Ne laser light, shows that the former is 0.55 and the latter 0.7, which is larger than the former in excess of 20%. In FIG. 4B, the reproducing layer 2 and the recording layer 3 are in reverse position from that of FIG. 4A. FIG. 5 shows an example of measured C/N of this embodiment, in which 48 dB were obtained even under the same condition as in the case of FIG. 3; this is an improvement value of about 3 dB. Thus the structure of the present invention provides a recording medium of a high S/N ratio, leading to a broadening of the application of the magneto-optical memory.

Although in the above embodiment the reproducing layer 2 is provided on the side of the substrate 1, it is also possible to provide the recording layer 3 on the side of the substrate 1 and to form thereon the reproducing layer 2 and the reflecting layer 5 in this order. Especially in the case where a plastic substrate of a large thermal expansion coefficient is used as the substrate 1 and the reproducing layer 2 is formed thereon, the magnetic easy axis sometimes does not become perpendicular to the film surface of the reproducing layer 2 as desired owing to thermal distortion thereto during fabrication processes. This phenomenon is particularly remarkable when using GdFe but in such a case it is effective to reverse the order to arrangement of the reproducing layer 2 and the recording layer 3.

Next, a description will be given of other embodiment of the present invention illustrated in FIGS. 6A, 6B and 6C. These embodiments are intended to cause multiple reflections of light in the medium so that the light is subjected, at a plurality of times, to the Kerr rotation when reflected by the reproducing layer 2 or the recording layer 3 and the Faraday rotation when passing therethrough. In FIGS 6A, 6B and 6C, reference numeral 6 indicates a dielectric layer as of SiO, $SiO_2$ or the like, disposed for introducing a refraction index difference in the medium. FIG. 6A is a structure in which the dielectric layer 6 is provided between the recording layer 3 and the reflecting layer 5 to utilize multiple reflections therebetween, and FIG. 6B a structure in which the dielectric layer 6 is provided between the substrate 1 and the reproducing layer 2 to utilize multiple reflections therebetween. Incidentally, FIG. 6C is a combination of the structures of FIG. 6A and FIG. 6B.

Also in these embodiments, the reproducing layer 2 and the recording layer 3 can be reversed in position as in the case of FIG. 4.

As has been described in the foregoing, the provision of the reflecting layer 5 and the dielectric layer 6 permits positive utilization of the Faraday rotation, in addition to the Kerr rotation, increasing the apparent Kerr rotation angle to reproduce light with a high S/N ratio; this effect is great.

Incidentally, any embodiments of the present invention can easily be manufactured through a vacuum evaporation method, a sputtering method, an ion plating method and so forth.

Further, the effect of the present invention can also be obtained by using, as the substrate, a grooved substrate which is intended to facilitate tracking.

What we claim is:

1. A magneto-optical recording medium comprising: a recording layer of a magnetic thin film low in the Curie temperature or magnetic compensation temperature and high in coercive force and having an easy axis of magnetization in a direction perpendicular to the film surface; a reproducing layer disposed adjacent the recording layer and large in the magnetic Kerr rotation angle and having an easy axis of magnetization in a direction perpendicular to the film surface; a transparent substrate disposed on the side of incidence of light; a reflecting metal layer for reflecting incident light having entered from the side of the transparent substrate passed through the recording layer and the reproducing layer; and a dielectric layer disposed at least on the side of the transparent substrate with respect to the recording layer and the reproducing layer and effective to cause multiple light reflections by the reproducing layer or the recording layer so that Kerr rotation and Faraday rotation are increased.

2. A magneto-optical recording medium according to claim 1, characterized in that, of the recording layer and the reproducing layer, the latter is disposed on the side of the transparent substrate.

3. A magneto-optical recording medium according to claim 1, characterized in that, of the recording layer and the reproducing layer, the former is disposed on the side of the transparent substrate.

* * * * *